April 15, 1958  A. ZAYCO  2,830,515
MACHINE FOR SHAVING THE STUBBLE OF SUGAR
CANE AND OTHER ROW CROPS
Filed June 16, 1955

Inventor:
Arturo Zayco,
by Heard, Smith, Porter & Chittick
Attorneys

2,830,515

MACHINE FOR SHAVING THE STUBBLE OF SUGAR CANE AND OTHER ROW CROPS

Arturo Zayco, Victorias, Philippine Republic

Application June 16, 1955, Serial No. 516,005

2 Claims. (Cl. 97—15)

This invention relates to an improved tractor-drawn or tractor mounted stubble cutter or shaver especially adaptable for use in shaving off the stubble remaining in the field after a crop of sugar cane has been harvested.

It is common practice to use a tractor-drawn or tractor mounted stubble shaver in sugar cane fields. Stubble shavers heretofore used in the art usually consist of a circular blade or disk having a sharp edge and rotating about an almost vertical axis. As the machine moves along the ground, the rotating disk cuts a row of stubble leaving a flat profile as seen from a vertical section taken perpendicular to the row of stubble.

Agricultural technicians have expressed a desire for a stubble shaver that can cut deeper, leaving a profile that approximates that of newly planted cane fields, that is, with the cane in a furrow and the soil between rows of cane at a higher elevation than the bottom of the furrow.

Accordingly, it is an object of the present invention to provide an improved stubble shaver adapted to so cut rows of stubble as to leave a furrow of circular contour in vertical section where the stubble has been removed.

Another object of this invention is to provide an improved stubble shaver comprising a circular cutter mounted for rotation about a substantially horizontal axis.

Other objects and many of the attendant advantages of this invention will be readily appreciated as the same becomes better understood by reference to the following detailed description when considered in connection with the accompanying drawings, wherein.

Figure 1:
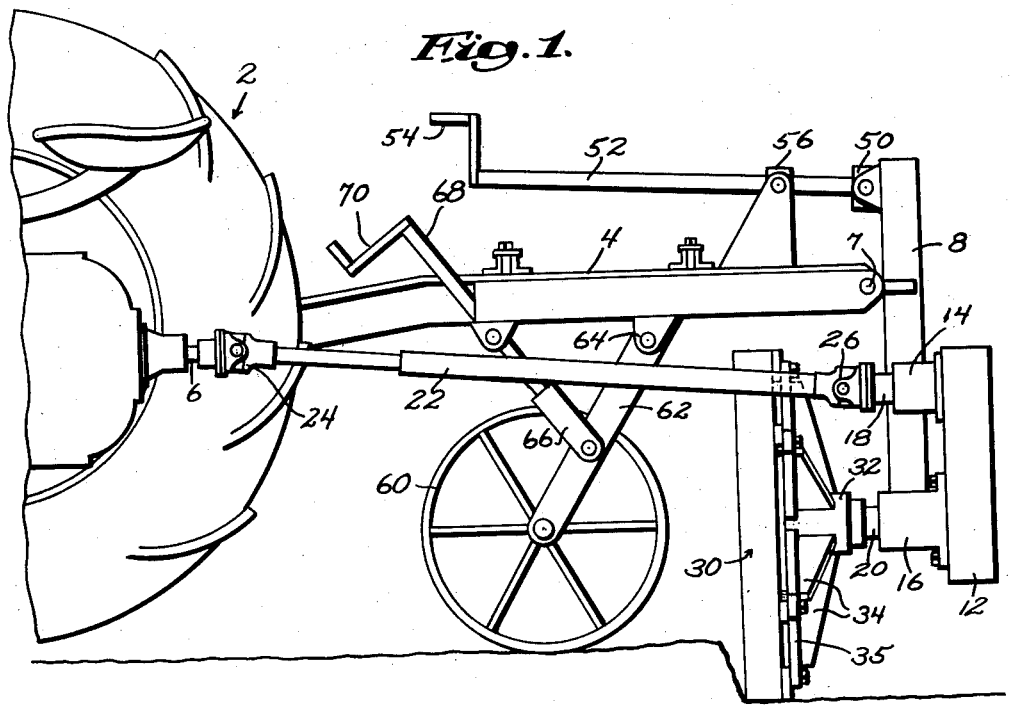
Fig. 1 is a side view in elevation of a shaver constructed according to this invention, the shaver as illustrated being mounted on a tool bar of a rubber wheeled tractor.
Figure 2:
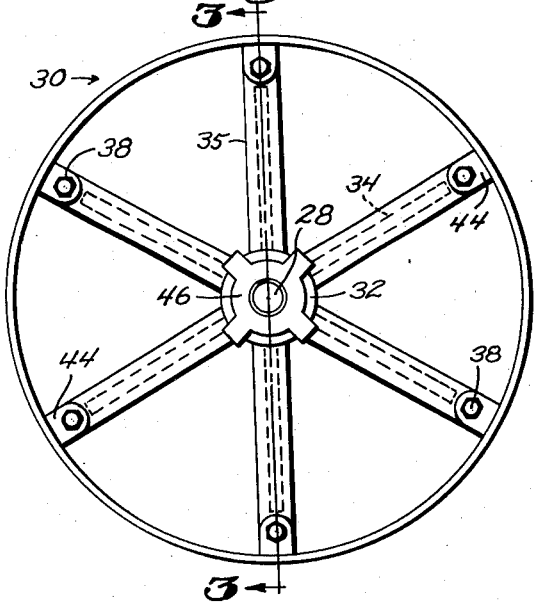
Fig. 2 is a front view in elevation of the cutting wheel of the shaver of Fig. 1; and, Fig. 3 is a sectional view taken along line 3—3 of Fig. 2.

Referring now to Fig. 1, there is shown a tractor generally designated as 2 having a tool bar 4 and a power take-off shaft 6. Pivoted to tool bar 4 at 7 is a standard 8 which supports a speed reduction unit 12. Gear reduction unit 12 has two bearing housings 14 and 16 in which are rotatably supported power input spindle 18 and power output spindle 20.

Figure 3:
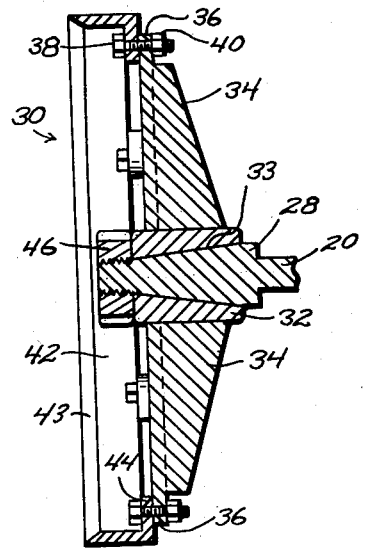

Input spindle 18 is operatively coupled to power take-off shaft 6 by a sliding or telescoping square shaft 22 and universal coupling elements 24 and 26. Spindle 20 has a tapered end 28 (Fig. 3) on which is mounted a cutting or shaving wheel generally designated as 30. Wheel 30 has a hub 32 provided with an opening 33 tapered to snugly receive the tapered end 28 of spindle 20. Welded to hub 32 is a plurality of radially arranged spokes, each comprising a web 34 and a flange 35. Webs 34 terminate short of flanges 35 to form lugs 36 at the end of each spoke. The latter have openings for receiving bolts 38 which cooperate with nuts 40 to secure a rim 42 to the spokes. On its forward side rim 42 is shaped to provide a knife edge 43. It is also to be understood that the forward edge 43 of the rim may be wavy, serrated or provided with saw teeth instead of being smooth as shown. Rim 42 has a plurality of perforated inwardly extending lugs 44 corresponding in number and position to lugs 36 of the spokes. Bolts 38 and nuts 40 secure lugs 36 and 44 together. Hub 38 is maintained on spindle 20 by means of a large nut 46 which is screwed on to threads provided at the extremity of tapered end 28 of spindle 20. By means of the aforesaid construction wheel 30 rotates with spindle 20.

Standard 8 is coupled at its top end to a bearing sleeve 50 in which is rotatably secured a crank shaft 52 having a handle 54. Crank shaft 52 extends through a second bearing sleeve 56 mounted on tool bar 4. It is to be understood that the interior surface of bearing sleeve 56 is threaded and the exterior surface of crank shaft 52 is likewise threaded so that the latter can be moved relatively to the former only when crank shaft 52 is turned. When crank shaft 52 is rotated standard 8 is caused to pivot at 7 relative to tool bar 4.

Also attached to tool bar 4 is a ground or gauge wheel 60. Wheel 60 is rotatably secured to the bottom end of a leg 62 which is pivotally secured at 64 to tool bar 4. Pivoted to leg 62 at a predetermined point intermediate its ends is a second leg 66 which is rotatably coupled to a second crank shaft 68 having a handle 70. Crank shaft 68 is in threaded engagement with a bearing sleeve element (not shown), which is connected to tool bar 4. When crank shaft 68 is turned by means of handle 70, leg 62 is caused to pivot at 64 relative to tool bar 4 and to thereby change the elevation of tool bar 4 and cutting wheel 30.

In operation, the height of tool bar 4 and cutting wheel 30 is first adjusted by rotating crank handle 70. By means of crank handle 54 cutting wheel 30 is caused to assume substantially a vertical position as shown in Fig. 1. Thereafter as the tractor tool is driven forwardly and power is transmitted to input spindle 18 from power take-off shaft 6, cutting wheel 30 is caused to rotate at a predetermined speed. As the machine continues to move along the ground the sharp edge 43 of rotating rim 42 cuts a row of stubble, dispersing the cuttings, and leaves a depression or furrow whose cross section profile is identical to the arc of the cutting rim in contact with the ground. The resulting profile proximates that of a newly planted cane field which as indicated previously is a result desired by Agricultural technicians.

It is to be understood that the diameter of the cutting rim may be varied to attain a desired profile in addition to adjusting the height of the cutting wheel. However, to obtain maximum performance the peripheral speed of the rim should remain the same for identical soil conditions. Hence, when a rim of different diameter is substituted, the speed of the driving shaft must also be changed to keep the peripheral speed constant. Although the rate of rotation of the cutting wheel may be varied to suit different ground conditions, it has been found that 250 revolutions per minute is sufficient for rims measuring approximately 26 to 32" in diameter. Since most tractor power take-off shafts rotate at a greater speed, e. g., approximately 520 R. P. M., it is essential to utilize a speed reduction mechanism such as is shown at 12 in Fig. 1. It is also to be understood that although the foregoing apparatus is shown connected to the tool bar of a tractor, it may just as satisfactorily be mounted on a trailer drawn by a tractor. The cutting rim of wheel 30 is preferably constructed of steel hard-faced with an alloy at its sharp edge by welding.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

I claim:

1. In combination with a tractor having a power take-off shaft and a rearwardly extending tool bar, means for adjustably supporting said tool bar above the ground as said tractor moves along its path of travel, a circular cutting component comprising a cylindrical rim having a sharp leading edge, a hub, and means securing said rim to said hub in concentric relation thereto, a rotatable driving shaft, means removably securing said hub to the end of said driving shaft whereby said cutting component will rotate with said driving shaft, a vertically extending standard pivotally secured to said tool bar, means attached to the lower end of said standard below said tool bar for supporting said driving shaft at right angles to said standard parallel to the line of travel of said tractor, means for pivoting said standard relative to said tool bar whereby to position said driving shaft parallel to the ground, and means connected to the power take-off shaft of said tractor for rotating said driving shaft whereby said cutting component is rotated as said tractor advances along its path of travel.

2. The combination of claim 1 wherein said sharp leading edge extends forwardly in the direction of travel of said tractor.

References Cited in the file of this patent

UNITED STATES PATENTS

| | | |
|---|---|---|
| 941,230 | Crow | Nov. 23, 1909 |
| 1,004,191 | Petersen | Sept. 26, 1911 |
| 1,578,746 | Mijnssen et al. | Mar. 30, 1926 |
| 1,763,099 | Mead | June 10, 1930 |
| 1,853,489 | Albaugh | Apr. 12, 1932 |
| 2,241,839 | Woodward | May 13, 1941 |
| 2,307,310 | Tyler et al. | Jan. 5, 1943 |
| 2,405,630 | Allen | Aug. 13, 1946 |
| 2,619,747 | Wiens | Dec. 2, 1952 |
| 2,782,854 | Mühlbach | Feb. 26, 1957 |

FOREIGN PATENTS

| | | |
|---|---|---|
| 619,713 | Great Britain | Mar. 14, 1949 |